US009115024B2

(12) United States Patent
Bescher et al.

(10) Patent No.: US 9,115,024 B2
(45) Date of Patent: Aug. 25, 2015

(54) RADIAL COAL ASH BASED MICRO-ARCHITECTURES AND METHOD OF SYNTHESIS

(75) Inventors: Eric P. Bescher, Los Angeles, CA (US); Jacob W. Stremfel, Canoga Park, CA (US); Grant M. Kao, Rowland Heights, CA (US); John T. Salkowski, Long Beach, CA (US); Walter J. Hoyle, Sparks, NV (US); John Kenneth Vallens, Ladera Ranch, CA (US); Edward K. Rice, Los Angeles, CA (US)

(73) Assignee: Macael, Inc., Los Angeles, CA (US)

( * ) Notice: Subject to any disclaimer, the term of this patent is extended or adjusted under 35 U.S.C. 154(b) by 424 days.

(21) Appl. No.: 13/408,915

(22) Filed: Feb. 29, 2012

(65) Prior Publication Data

US 2013/0220181 A1 Aug. 29, 2013

(51) Int. Cl.
| | |
|---|---|
| C04B 28/06 | (2006.01) |
| C04B 18/08 | (2006.01) |
| B82Y 30/00 | (2011.01) |
| C04B 111/00 | (2006.01) |
| C04B 103/00 | (2006.01) |

(52) U.S. Cl.
CPC ............... C04B 18/08 (2013.01); B82Y 30/00 (2013.01); C04B 28/065 (2013.01); *C04B 2103/0067* (2013.01); *C04B 2111/00008* (2013.01); *C04B 2111/0025* (2013.01); *Y10T 428/2982* (2015.01)

(58) Field of Classification Search
CPC ..................................................... C04B 28/06
USPC .......................................... 106/705, DIG. 1
See application file for complete search history.

(56) References Cited

U.S. PATENT DOCUMENTS

| | | | | |
|---|---|---|---|---|
| 866,376 | A | | 9/1907 | Meade |
| 3,785,840 | A | * | 1/1974 | Minnick et al. ............... 106/710 |
| 3,854,968 | A | | 12/1974 | Minnick et al. |
| 4,018,963 | A | * | 4/1977 | Fuji et al. .................... 428/294.7 |
| 4,255,398 | A | * | 3/1981 | Tanaka et al. ................. 423/117 |
| 4,256,500 | A | | 3/1981 | Turpin, Jr. |
| 4,256,504 | A | | 3/1981 | Dunstan, Jr. |
| 4,350,533 | A | * | 9/1982 | Galer et al. ................... 106/695 |
| 5,118,219 | A | | 6/1992 | Walker, Jr. et al. |
| 6,641,658 | B1 | | 11/2003 | Dubey |

(Continued)

FOREIGN PATENT DOCUMENTS

| | | |
|---|---|---|
| GB | 2265916 | 10/1993 |
| WO | WO-9739054 | 10/1997 |

OTHER PUBLICATIONS

Abo-El-Enein, S.A. , et al., "Blended Cements Containing Cement Kiln Dust", Silicates Industriels, vol. 59, No. 9-10, (1994), pp. 265-269.

(Continued)

*Primary Examiner* — Paul Marcantoni
(74) *Attorney, Agent, or Firm* — Kenneth H. Ohriner; Perkins Coie LLP

(57) ABSTRACT

Microparticles having crystalline needle or rod-shaped structures of, for example, an ettringite mineral grown and attached radially from their surface. A method including nucleating and growing crystalline needles/rods from the surface of a particle in the presence of a solution of calcium, sulfur, and aluminum such as calcium sulfoaluminate, lime and calcium sulfate is described. One example is the radial growth of ettringite needles on the surface of fly ash particles in calcium sulfoaluminate-based cement paste and concrete.

10 Claims, 6 Drawing Sheets

(56) References Cited

U.S. PATENT DOCUMENTS

2004/0003757 A1 1/2004 Chern Lin et al.
2004/0040474 A1 3/2004 Perez-Pena et al.
2012/0031308 A1* 2/2012 Fradera Pellicer ............ 106/784
2012/0145044 A1* 6/2012 Mills et al. .................... 106/695

OTHER PUBLICATIONS

Hawkins, Peter, et al., "The Use of Limestone in Portland Cement: A State-of-the-Art Review", Engineering Bulletin 227, Portland Cement Association, Skokie, Illinois, (2003), 41 pages.
Ravindrarajah, R. S., "Use of cement kiln dust in concrete", The International Journal of Cement Composites and Lightweight Concrete, vol. 4, No. 2, (May 1982), pp. 95-102.
Macael, Inc., "Office Action Dated Jul. 10, 2013; U.S. Appl. No. 13/281,241" (Jul. 10, 2013).
Macael, Inc., "Invitation to pay additional fees", PCT/US2013/028374, (Jul. 3, 2013).
Cody, A. M., et al., "The effects of chemical environment on the nucleation, growth, and stability of ettringite [Ca3Al(OH)6]2(SO4)3•26H2O", *Cement and Concrete Research*, 34, (2004), pp. 869-881.
CTS Cement Manufacturing, PCT Search Report mailed Nov. 6, 2013 for PCT/US2013/028374, 17 pages.
Kitahara, Shinichi, et al., "Precision and detection limit of quality test for amorphous drug in powder X-ray diffractometry", *International Journal of Pharmaceutics*, 283, (2004), pp. 63-69.
Nel, P., et al., "Non-destructive micro-X-ray diffraction analysis of painted artefacts: Determination of detection limits for the chromium oxide-zinc oxide matrix", *Nuclear Instruments and Methods in Physics Research B*, 251, (2006), pp. 489-495.

\* cited by examiner

RADIAL COAL ASH BASED MICRO-ARCHITECTURES AND METHOD OF SYNTHESIS

BACKGROUND

1. Field

Nano or micro-sized inorganic structures and their synthesis.

2. Description of the Related Art

The synthesis of complex-shape, self-standing nano or micron-sized structures usually requires extremely precise, complex, and expensive fabrication equipment. Techniques such as micromachining or laser ablation, are usually required. Such processes are not only expensive, but are also difficult, time consuming and of generally low throughput. A much more alluring prospect is the chemical method of self-assembly. Self-assembly of nano and microstructures is the spontaneous or controlled organization of molecules into distinct and ordered architectures, usually within a solution. Its most significant advantage is that the process is carried out through chemical rather than mechanical means.

Self-assembled microstructures on components of a combination product may offer improved properties to the product. Concrete is an example of a combination of materials such as cement, sand and additives and/or fillers mixed in solution. Mortar is another example. Heretofore, the development of microstructures in components of a concrete or mortar product have not been observed or exploited to modify a property of the product.

DETAILED DESCRIPTION

Figure 1:
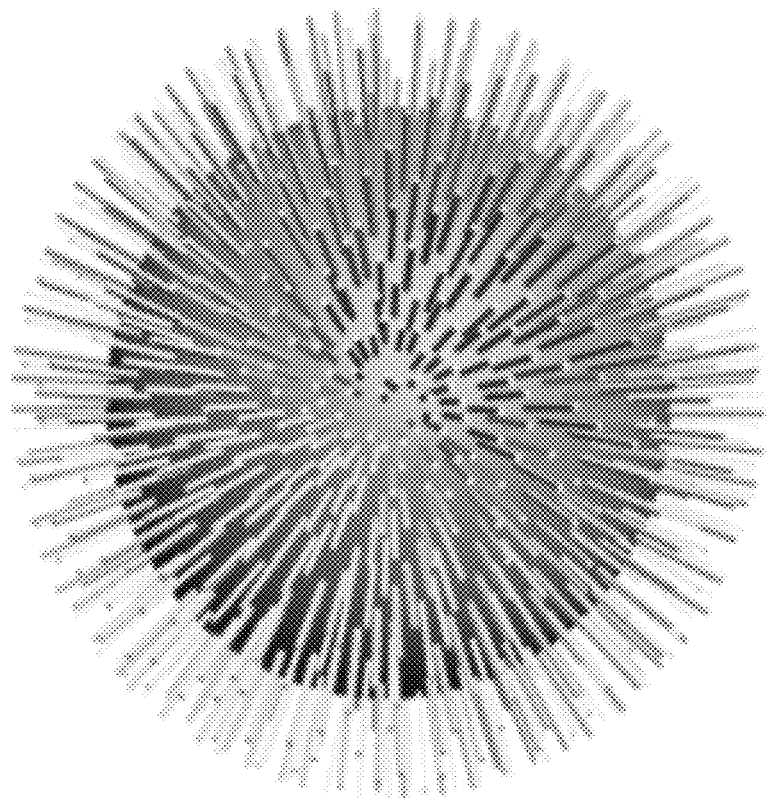
FIG. 1 is a computer-generated three-dimensional model of a spherical particle with 1,000 crystalline structures radially attached.

A crystalline structure or phase in a shape of needles or rods attached radially to a surface of a substrate and a method of manufacture are described. In one embodiment, a suitable substrate is a fly ash particle and the crystalline structure or phase formed on a surface of the fly ash particle is ettringite. In one embodiment, the structures are self-assembled or self-organized in a matrix of calcium, sulfur and aluminum ions at a stoichiometry suitable for the growth of ettringite. One suitable base or matrix is hydrated calcium sulfoaluminate (CSA) cement paste. Because the cementitious matrix contains a source of calcium, aluminum and sulfur in suitable stoichiometry, ettringite needles form and attach themselves to the surface of the fly ash particles (e.g., spherical particles), forming very unique, unexpected and heretofore unknown microstructures. In addition to their unique and novel geometry, these heretofore unknown structures can enhance and optimize the properties of the matrix they are embedded within, such as a cement paste or a concrete member. Specifically, they have been shown to improve the mechanical and physical characteristics of the cement paste or concrete within which they grow. Alternatively, the particles may be harvested from the matrix for use in other environments, such as to improve a property of a non-CSA cement.

Example

In one embodiment, a base or matrix is a calcium sulfoaluminate cement having the chemical composition is shown in Table 1.

TABLE 1

Chemical Analysis of the Calcium Sulfoaluminate Cement

|  | (wt %) |
| --- | --- |
| Main equivalent oxides |  |
| $SiO_2$ | 15.5 |
| $Al_2O_3$ | 15.3 |
| $Fe_2O_3$ | 1.5 |
| CaO | 50.5 |
| MgO | 1.2 |
| $SO_3$ | 14.5 |
| Compounds |  |
| Calcium sulfoaluminate | 25% |
| Anhydrite $CaSO_4$ | 10% |

A calcium sulfoaluminate hydraulic cement may contain from two to 70 percent calcium sulfoaluminate. In another embodiment, a calcium sulfoaluminate hydraulic cement base or matrix may contain five to 50 percent calcium sulfoaluminate.

The cement is combined with a fly ash particle composition. In one embodiment, a calcium sulfoaluminate cement is mixed with 30 percent by weight of a fly ash particle composition. In one embodiment, the fly ash particles have the composition shown in Table 2. In the United States, fly ash is generally categorized in classes (such as C or F) according to its cementitious value. Without wishing to be bound by any particular theory, it is theorized that microstructures as described herein can be grown using fly ash of any classification or even unclassified fly ash. It does not appear that the type of fly ash used (ex. Type C, F or otherwise) affects the formation of the microstructures. The chemical composition of the fly ash particle does not appear to play an important role in the growth of ettringite crystals on its surface.

TABLE 2

Chemical Composition of the Fly Ash (Main oxides-wt %)

| $SiO_2$ | 59.84 |
| --- | --- |
| $Al_2O_3$ | 22.41 |
| $Fe_2O_3$ | 5.34 |
| CaO | 6.09 |
| MgO | 1.3 |
| $SO_3$ | 0.28 |
| L.O.I. | 0.80 |

In one embodiment, fresh water is added to the combination of cement and fly ash in a water to cement (w/c) ratio equal to 0.40 percent. The w/c ratio can range from 0.2 to 0.8. Silica sand is also added. The characteristics of the sand do not appear to play a role in the growth of the microstructures.

Standard 2-inch mortar cubes were made following the ASTM C109 protocol, using the following proportions:

TABLE 3

| Cement paste w/o Super Plasticizer | w/c | Fly Ash (grams) | Super P (grams) | RSC (grams) | Sand (grams) |
|---|---|---|---|---|---|
| No Fly Ash | 0.40 | 0 | 0 | 1,000 | 1,000 |
| 30% Fly Ash | 0.40 | 300 | 0 | 700 | 1,000 |

TABLE 4

| Cement paste w/ Super Plasticizer | w/c | Fly Ash (grams) | Super P (grams) | RSC (grams) | Sand (grams) |
|---|---|---|---|---|---|
| No Fly Ash | 0.40 | 0 | 18.0 | 982.0 | 1,000 |
| 30% Fly Ash | 0.40 | 294.6 | 18.0 | 687.4 | 1,000 |

The composition in Table 4 includes a melamine based super plasticizer, specifically MELMENT®. The composition in Table 3 does not. Both samples contained 30 percent by weight fly ash and have a water to cement ratio (w/c) of 0.40. Fly ash compositions ranging from a few weight percent to in excess of 80% can be used.

Self-assembled or self-organized structures were observed to grow during the early stage, e.g. within three hours of hydration of the calcium sulfoaluminate cement powder. Without wishing to be bound by this theory, it is speculated that the ettringite structures (e.g., needles) form through the following overall chemical reaction: $3CaO.3Al_2O_3.CaSO_4 + 8(CaSO_4.2H_2O) + 6Ca(OH)_2 + 74H_2O \rightarrow 3(3CaO.Al_2O_3.3CaSO_4.32H_2O)$.

The mixing protocol, timing and sequence followed are fully described in ASTM C 109 do not appear to affect the formation of the structures.

Figure 2:
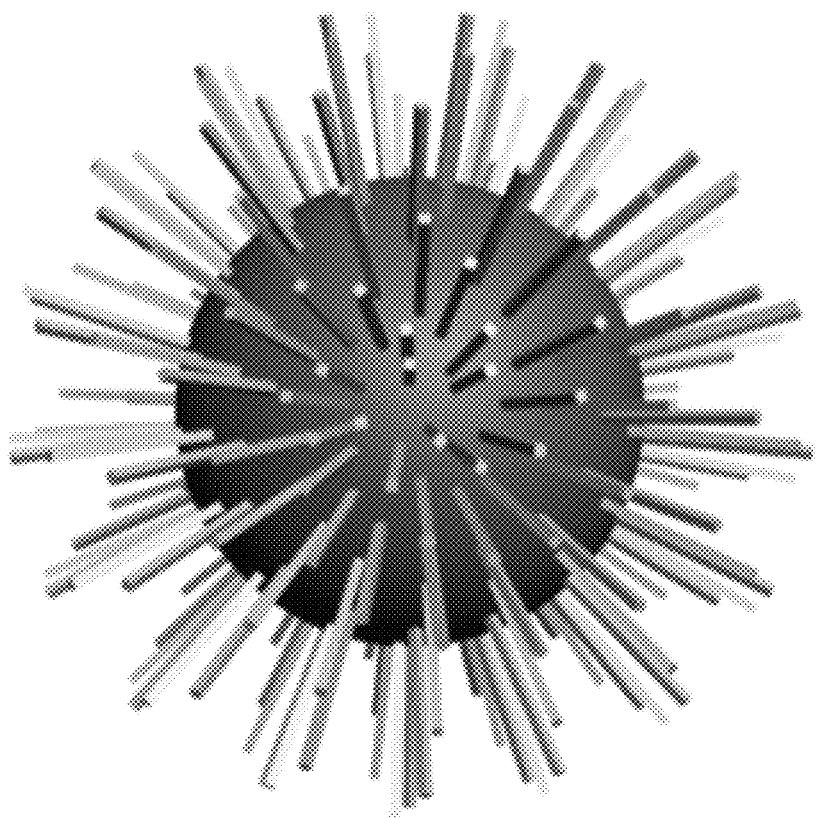
FIG. 2 is a three-dimensional model of a spherical particle with 200 crystalline structures radially attached.

FIG. 1 shows a three-dimensional model of a microstructure, including a spherical particle such as a spherical fly ash particle, with 1000 crystalline structures radially attached thereto. The crystalline structures are self-assembled or self-organized in the sense that the structures appear to nucleate and grow on the particle (i.e., grow from a surface of the particle) in solution at room temperature (room temperature solution chemistry). This particular model represents a structure built within a cement paste in the absence of an organic super plasticizing agent such as a melamine based super plasticizing agent (e.g., MELMENT®). Organic additives can affect the growth and number of crystalline structures growing on the surface of the coal ash cenosphere. Without wishing to be bound to a specific theory, it is theorized that the organic superplasticizing agent affects the growth of crystalline structures on the surface of the sphere. For example, FIG. 2 shows a three-dimensional model or a spherical particle with 200 crystalline structures attached. This particular model represents a microstructure built within a cement paste in the presence of an organic super plasticizing agent.

Figure 3:
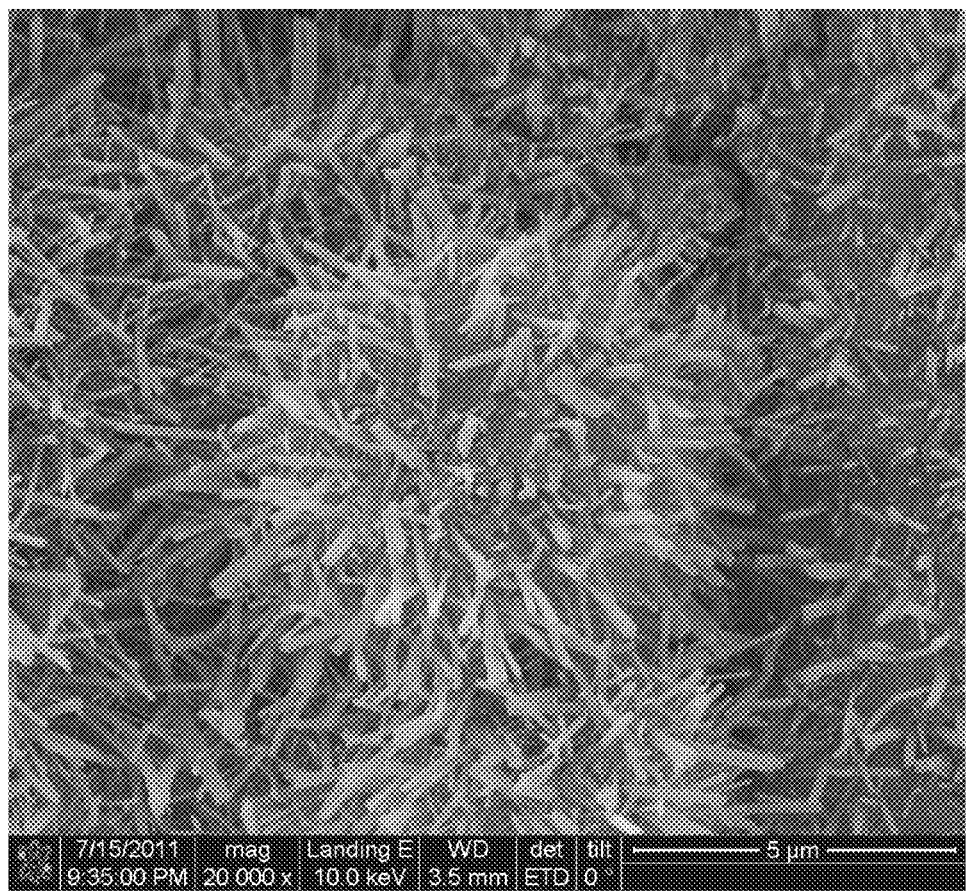
FIG. 3 is a scanning electron microscope (SEM) image of an individual fly ash particle in which single crystals or polycrystalline ettringite needles have grown radially from the surface in the absence of a super plasticizing agent.
Figure 4:
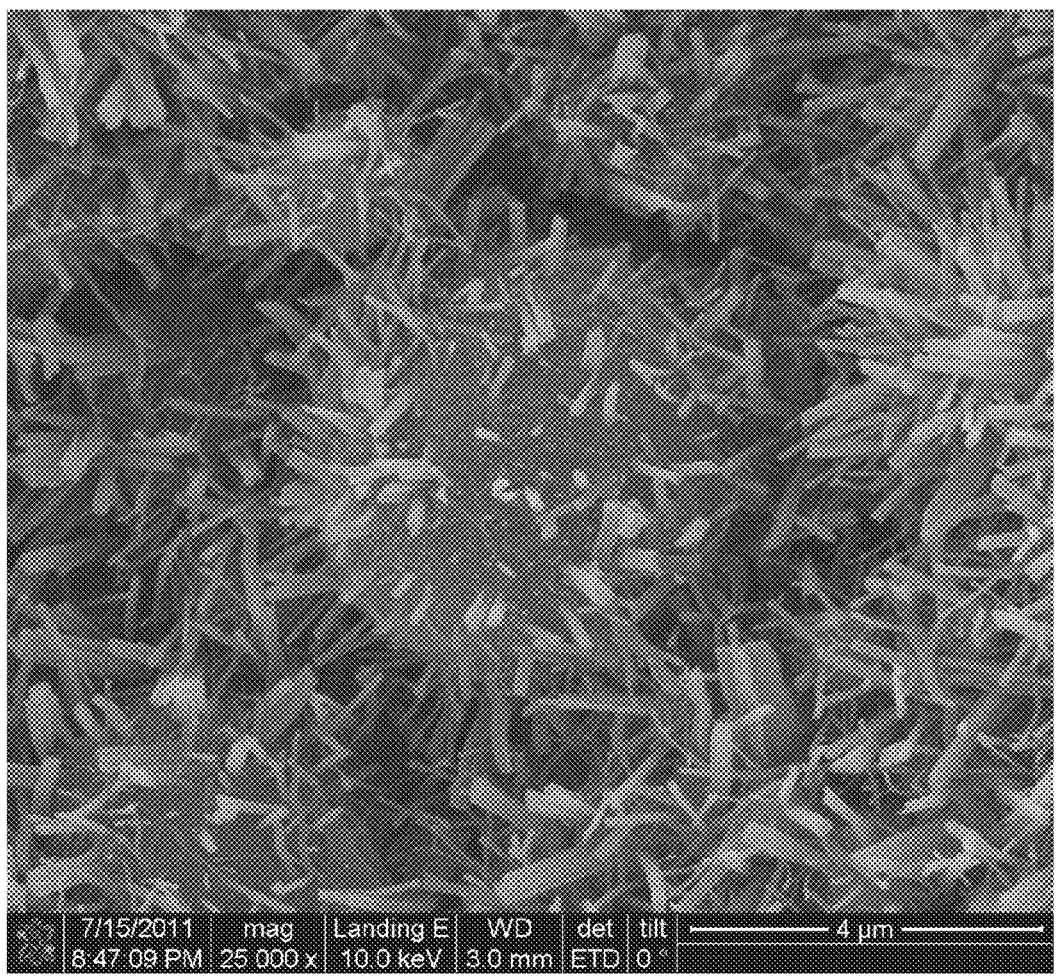
FIG. 4 is a scanning electron microscope (SEM) image of an individual fly ash particle in which single crystals or polycrystalline ettringite have grown radially from the surface in the presence of a super plasticizing agent.
Figure 5:
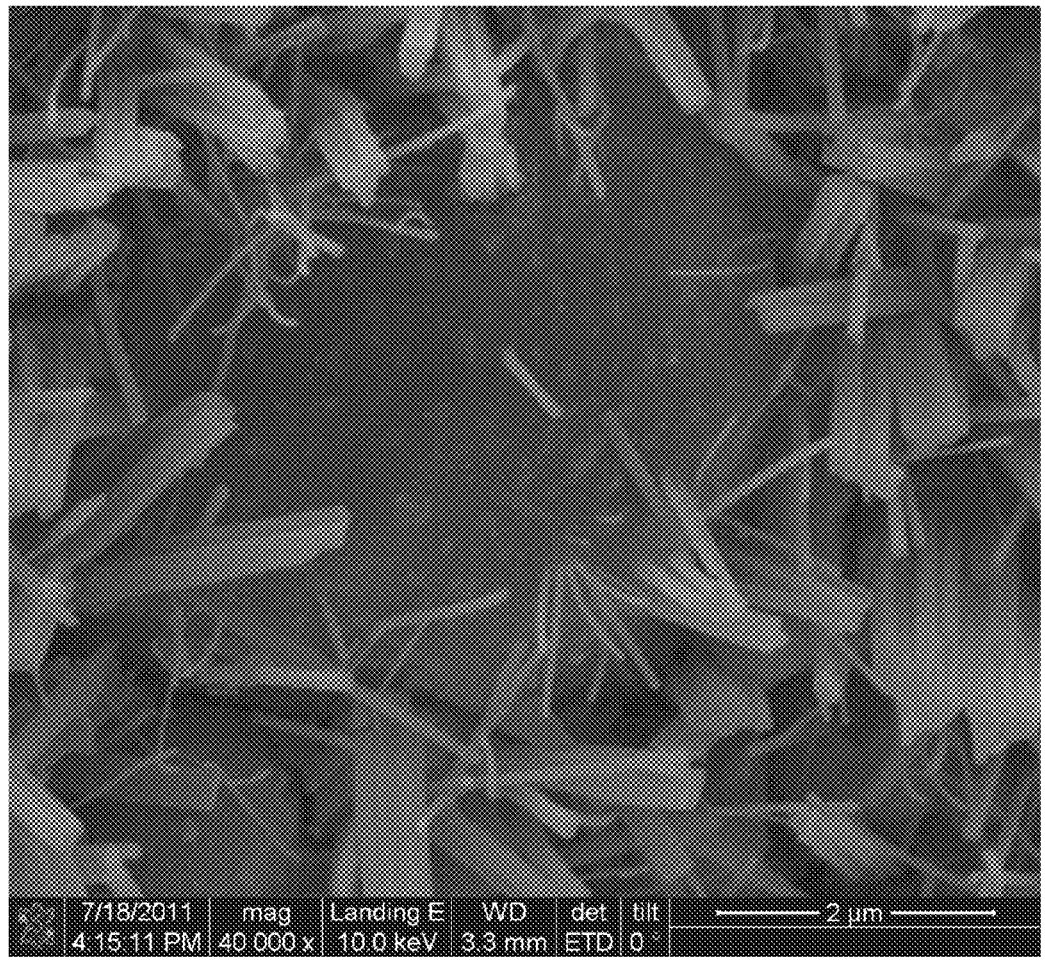
FIG. 5 is a scanning electron microscope (SEM) image of an individual fly ash particle in which the interface between the ettringite and fly ash particle can be more readily seen, showing the nucleation and growth mode.

FIG. 3 is a scanning electron microscope (SEM) image of an individual fly ash particle in which crystals of ettringite have grown radially from the surface in the absence of a super plasticizing agent according to the example and Table 3. FIG. 4 is a scanning electron microscope (SEM) image of an individual fly ash particle in which single crystals or polycrystals of ettringite needle structures have grown radially from the surface in the presence of a super plasticizing agent according to example and Table 4. FIG. 5 is a scanning electron microscope (SEM) image of an individual fly ash particle in which the interface between the ettringite and fly ash particle is more readily seen, showing the nucleation and growth mode. This figure also shows the fly ash particle having individual needle structures grown therefrom as well as clusters of individual crystalline needle structures.

In one embodiment, the crystalline architectures of microparticles (e.g., microspheres) have a total diameter ranging from 0.1 and 100 microns (μm). The crystalline architectures of crystalline needle or rod structures have a length ranging from 0.05 to 50 μm and a diameter or width ranging from 5 to 5,000 nanometers (nm). In another embodiment, the crystalline structures having slight or no tapering in cross-section along the length of the structure and have a rectangular or circular cross-section. The crystalline structures have a total quantity per microparticle ranging from 10 to 10,000.

A significant increase in the compressive strength of cement paste was observed when the crystalline structures where present, compared to cement paste that did not contain such structures, as shown in Tables 5 and 6. An increase in compressive strength of about 5 MPa was observed. In the case of samples made using a superplasticizer additive, the increase in strength was lower.

Table 5 shows the compressive strength values for cement pastes with and without 30 percent by weight fly ash in the absence of a superplasticizer agent (MELMENT®). The water to cement ratio (w/c) was kept constant at 0.40. The compressive strength was obtained using the ASTM C109 standard at 1.5, 3.0, and 24 hours after hydration.

Table 6 shows the compressive strength values for cement paste with and without 30 percent by weight fly ash, in the presence of a superplasticizing agent (MELMENT®). The water to cement ratio (w/c) was kept constant at 0.40, and the compressive strength values were obtained using the ASTM C109 standard at 1.5, 3.0, and 24 hours after hydration.

TABLE 5

| Cement Paste w/o Super Plasticizer | w/c | 1.5 Hours (MPa) | 3.0 Hours (MPa) | 24 Hours (MPa) |
|---|---|---|---|---|
| No Fly Ash | 0.40 | 39.6 | 50.1 | 58.5 |
| 30% Fly Ash Replacement | 0.40 | 42.1 | 54.4 | 63.7 |

TABLE 6

| Cement Paste w/ Super Plasticizer | w/c | 1.5 Hours (MPa) | 3.0 Hours (MPa) | 24 Hours (MPa) |
|---|---|---|---|---|
| No Fly Ash | 0.40 | 38.2 | 47.1 | 55.0 |
| 30% Fly Ash Replacement | 0.40 | 39.3 | 48.5 | 60.1 |

Figure 6:
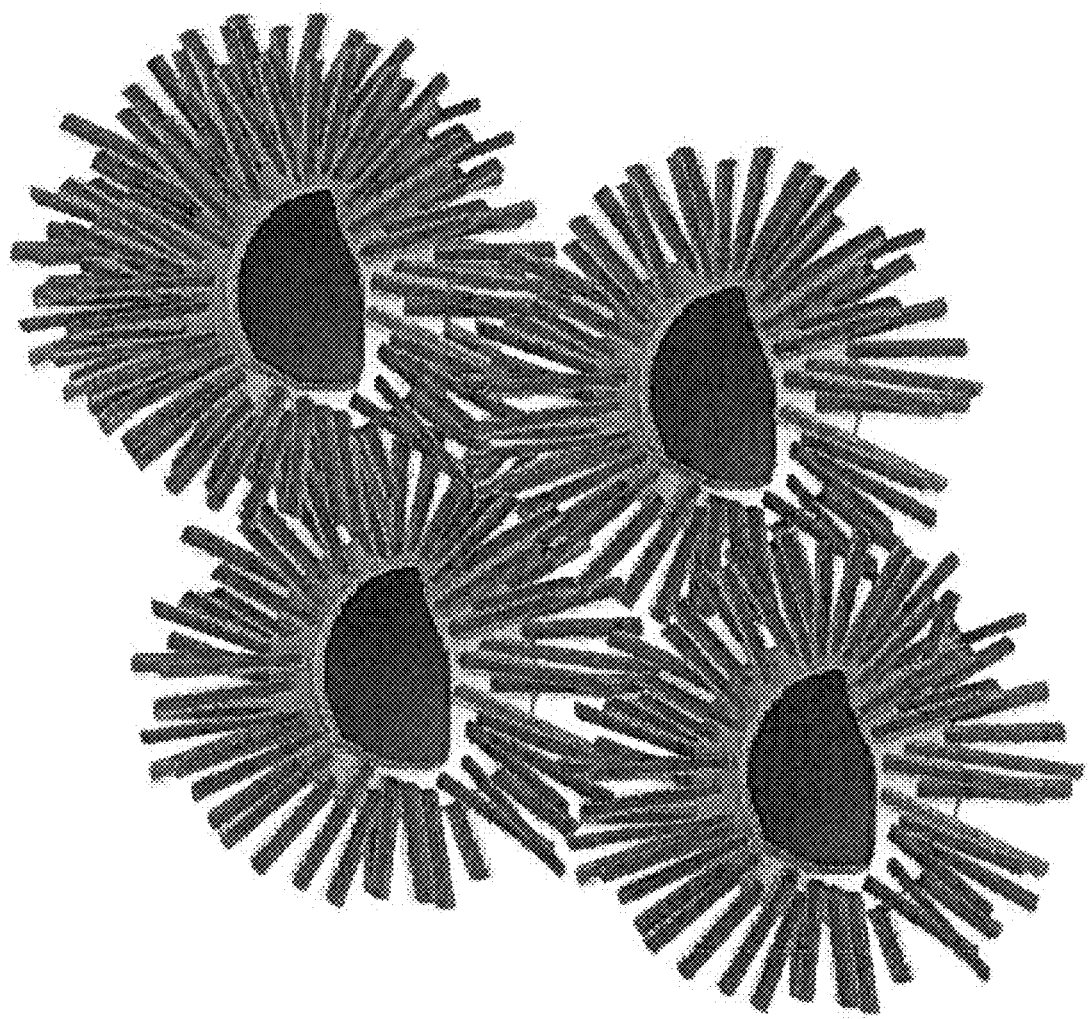
FIG. 6 is a representation of multiple particles with interlocking crystalline structures.

It is appreciated that other substrates, including other grades of fly ash are suitable for supporting crystalline structures of ettringite or other mineral composition. Examples of substrates may include hollow or solid glass, polymer, ceramic and metal substrates. Although a specific example is provided using ettringite needle or rod-shaped structures, it is appreciated that other mineral structures are also contemplated. Not only are the single crystal structures themselves expected to be very strong and act as a mechanical reinforcement, but the self-organized radial arrangement of the single crystal structures around the particle (e.g., microparticle) in this embodiment is theorized to cause an increase in mechanical strength though more effective interlocking of the ettringite single crystals. The interlocking of such structures is theorized to impede plastic and elastic deformation, increase the yield strength, compressive strength, and elastic modulus of the material (FIG. 6). Reduced concrete shrinkage and enhanced concrete freeze-thaw resistance have also been observed.

The growth of mineral structures such as ettringite needles on a substrate may involve mixing hollow or full glass spheres with suitable chemical compounds that dissolve in a solvent (e.g. water) that does not appreciably attack or dissolve the substrate, allowing a crystalline phase to nucleate and grow on the substrate surface. For example, in order to grow needles of the ettringite phase $Ca_6Al_2(OH)_{12}.(SO_4)_3.\sim 26H_2O$ on the surface of fly ash substrate, the fly ash spheres can be mixed with a soluble source of aluminum (such as hydroxide gel, aluminum sulfate hydrate or tricalcium aluminate), calcium sulfate, calcium hydroxide and water to get the desired composition. In the above examples, a calcium sulfoaluminate cement powder was used as material containing all three compounds. It is appreciated that the calcium sulfoaluminate cement chemistry is very different from that of Portland cement. In spite of the long history of mixing fly ash with Portland cement, these structures have never been observed in traditional Portland cement or concrete. This is because the chemical composition of Portland cement paste is not suitable for the growth of ettringite needles on the surface of fly ash. Therefore, the formation of these structures is expected to be unique to calcium sulfoaluminate-based cements and concretes. However, this disclosure is not limited to the use of calcium sulfoaluminate cements either or the mineral structures in a cement, concrete or mortar. These structures have also been observed when fly ash is combined with reagent grade calcium sulfoaluminate, calcium sulfate and lime. In another embodiment, other inorganic phases able to grow from a solution on the surface of fly ash particles or other substrate are disclosed. Such phases include crystalline structures of oxides, combinations of oxides, combinations of planar or nanotubular oxides, and combinations of oxides and organic-inorganic compounds attached radially to a surface of a substrate such as fly ash or glass microspheres. Without wishing to be bound by theory, it is believed that small crystals of oxides on the surface of the surface of the particles or in the matrix act as nucleation agents for growth of such structures. The mineral structures once formed can be harvested from the matrix or base. In the case of a cementitious matrix, the harvesting may representatively be accomplished within three hours of hydration by dissolving the matrix and separating (e.g., filtering) the particles from the matrix.

Accordingly, the scope of this invention covers not just the physical features and method used to produce these structures, but also their potentially unique and novel mechanical, or physical characteristics whether inherent or provided to a matrix material when used as a composite.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The invention claimed is:

1. A microparticle comprising a fly ash substrate comprising a plurality of crystalline needle or rod-shaped structures of an ettringite mineral attached radially to a surface of the substrate.

2. The microparticle of claim 1 having a total diameter ranging from 0.1 and 100μ.

3. The microparticle of claim 1, wherein the crystalline needle or rod-shaped structures have a length ranging from 0.05-50μ.

4. The microparticle of claim 1 wherein the crystalline needle or rod-shaped structures have a diameter or width ranging from 5 to 5,000 nm.

5. The microparticle of claim 1, wherein the crystalline needle or rod-shaped structures have no tapering in cross-section along their length of the structure.

6. The microparticle of claim 1, wherein the crystalline needle or rod-shaped structures have a rectangular or circular cross-section.

7. The microparticle of claim 1, wherein the total quantity per microsphere of crystalline needle or rod-shaped structures range from 10 to 10,000.

8. A microparticle comprising a fly ash substrate having a plurality of crystalline needle or rod-shaped structures of an ettringite mineral attached radially to a surface of the substrate, with the microparticle having a total diameter ranging from 0.1 and 100μ, and the crystalline needle or rod-shaped structures have a length ranging from 0.05-50μ and a diameter or width ranging from 5 to 5,000 nm.

9. A microparticle having a fly ash substrate comprising a plurality of crystalline needle or rod-shaped structures of an ettringite mineral attached radially to a surface of the substrate, and the ettringite mineral formed from hydration of calcium sulfoaluminate cement.

10. The microparticle of claim 9 having a total diameter ranging from 0.1 and 100μ, and the crystalline needle or rod-shaped structures have a length ranging from 0.05-50μ and a diameter or width ranging from 5 to 5,000 nm.

* * * * *